United States Patent
Zhang et al.

(10) Patent No.: US 12,069,170 B2
(45) Date of Patent: Aug. 20, 2024

(54) MULTI-PARTY PRIVACY COMPUTING METHOD AND DEVICE BASED ON SEMI-TRUSTED HARDWARE

(71) Applicants: ZHEJIANG UNIVERSITY, Zhejiang (CN); JIAXING RESEARCH INSTITUTE, ZHEJIANG UNIVERSITY, Zhejiang (CN)

(72) Inventors: Bingsheng Zhang, Hangzhou (CN); Yibiao Lu, Hangzhou (CN); Weiran Liu, Hangzhou (CN); Kui Ren, Hangzhou (CN)

(73) Assignees: ZHEJIANG UNIVERSITY, Hangzhou (CN); JIAXING RESEARCH INSTITUTE, ZHEJIANG UNIVERSITY, Jiaxing (CN)

( * ) Notice: Subject to any disclaimer, the term of this patent is extended or adjusted under 35 U.S.C. 154(b) by 0 days.

(21) Appl. No.: 18/540,943

(22) Filed: Dec. 15, 2023

(65) Prior Publication Data
US 2024/0137217 A1    Apr. 25, 2024

Related U.S. Application Data

(63) Continuation of application No. PCT/CN2021/141686, filed on Dec. 27, 2021.

(30) Foreign Application Priority Data

Dec. 24, 2021 (CN) .......................... 202111598466.2

(51) Int. Cl.
H04L 9/08    (2006.01)
(52) U.S. Cl.
CPC ................................ *H04L 9/0869* (2013.01)

(58) Field of Classification Search
None
See application file for complete search history.

(56) References Cited

U.S. PATENT DOCUMENTS

| | | | |
|---|---|---|---|
| 9,124,417 B2* | 9/2015 | Kolesnikov | H04L 9/06 |
| 2009/0175443 A1* | 7/2009 | Kolesnikov | H03K 19/21 |
| | | | 380/255 |

(Continued)

FOREIGN PATENT DOCUMENTS

| | | |
|---|---|---|
| CN | 104685826 A | 6/2015 |
| CN | 107690769 A | 2/2018 |

(Continued)

OTHER PUBLICATIONS

International Search Report (PCT/CN2021/141686); Date of Mailing: Sep. 7, 2022.

(Continued)

*Primary Examiner* — Bassam A Noaman
(74) *Attorney, Agent, or Firm* — W&G Law Group (57) ABSTRACT

A multi-party privacy computing method and device based on semi-trusted hardware, wherein the method applied to semi-trusted hardware comprises the following steps: acquiring random number masks and random seeds of all user terminals; generating a garbled circuit seed according to the random seeds; generating a garbled circuit according to a predetermined circuit description and the garbled circuit seed, wherein the garbled circuit comprises garbled tables, wire labels and decoding information; sending the wire labels corresponding to the inputs of all user terminals to a user terminal corresponding to the semi-trusted hardware by using an oblivious transfer protocol; and sending the garbled table and the decoding information to the user terminal corresponding to the semi-trusted hardware, so that the user terminal can compute an output value according to the (Continued)

garbled tables, the decoding information and the wire label corresponding to the inputs of all user terminals.

9 Claims, 7 Drawing Sheets

(56) References Cited

U.S. PATENT DOCUMENTS

| | | | | |
|---|---|---|---|---|
| 2012/0079602 | A1* | 3/2012 | Kolesnikov | H04L 9/14 726/26 |
| 2014/0040614 | A1 | 2/2014 | Kolesnikov et al. | |
| 2014/0095861 | A1* | 4/2014 | Kolesnikov | H04L 9/32 713/151 |
| 2015/0007258 | A1* | 1/2015 | Patey | G06V 40/10 726/1 |
| 2018/0144112 | A1* | 5/2018 | Pitel | G06F 21/14 |
| 2019/0377908 | A1* | 12/2019 | Zhu | G06F 12/14 |
| 2021/0133587 | A1* | 5/2021 | Mohassel | G06N 20/00 |
| 2022/0029987 | A1* | 1/2022 | Salter | G09C 1/00 |

FOREIGN PATENT DOCUMENTS

| | | |
|---|---|---|
| CN | 111008256 A | 4/2020 |
| CN | 111125727 A | 5/2020 |
| CN | 104521178 A | 5/2021 |
| CN | 112865953 A | 5/2021 |
| CN | 113591146 A | 11/2021 |
| WO | 2020034751 A1 | 2/2020 |

OTHER PUBLICATIONS

Verifiable-Computation-Using-Re-randomizable-Garbled-Circuits.
Revisiting-Secure-Computation-Using-Functional-Encryption: Opportunities-and-Research-Directions.
Notice of Allowance (CN202111598466.2): Date of Mailing: Jul. 16, 2023.
Correlated Randomness Teleportation via Semi-trusted Hardware-Enabing Silent Multi-party Computation.
Lightweight two-party secure computation protocol based on SGX.

* cited by examiner

MULTI-PARTY PRIVACY COMPUTING METHOD AND DEVICE BASED ON SEMI-TRUSTED HARDWARE

CROSS-REFERENCE TO RELATED APPLICATIONS

The present application is a continuation of International Application No. PCT/CN2021/141686, filed on Dec. 27, 2021, which claims priority to Chinese Application No. 202111598466.2, filed on Dec. 24, 2021, the contents of both of which are incorporated herein by reference in their entireties.

TECHNICAL FIELD

The present disclosure relates to the field of privacy protection data processing, in particular to a multi-party privacy computing method and device based on semi-trusted hardware.

BACKGROUND

With the development of computer network technology, electronic election, electronic auction and private information retrieval are increasing, which require participants to exchange private data and cooperate to complete computing tasks. In order to ensure the privacy and security of data while sharing data for computation, privacy computing technology can be applied, and Secure Multi-party Computation (MPC) technology is the core component of privacy computing technology. It allows multiple participants who do not trust each other to jointly compute a pre-agreed function without the existence of a trusted third party, while not revealing any information except the function output, such as the privacy input of the participants. Due to the mutual distrust among participants, the traditional secure multiparty computing technology needs to use all kinds of cryptographic primitive design protocols. Through secret sharing, homomorphic encryption, garbled circuits and other technologies, each participant can only perform operations on the encrypted data, so as to prevent the participants from directly acquiring the plaintext privacy data of other user terminals. Another secure multi-party computing technology is based on semi-trusted hardware. In the protocol, the semi-trusted hardware is regarded as a trusted third party, and the participants directly send private data to the semi-trusted hardware in plaintext through a secure channel, and the semi-trusted hardware directly calculates the results on the plaintext data and outputs them.

However, in the process of realizing the present disclosure, the inventor found that there are at least the following problems in the prior art:

For the method of constructing secure multi-party computing protocol by using cryptography, this method requires a large amount of communication, many communication rounds, and takes a long time in the actual operation process, which leads to the participants needing to be in the computing process for a long time. Once disturbed, the whole computing process may fail. For the method of designing secure multi-party computing protocol using semi-trusted hardware, this method introduces an additional trusted root, which depends on the assumption that semi-trusted hardware will not steal the privacy of participants. Once this assumption fails, the privacy input of all participants will be directly leaked. Generally speaking, the prior art either has the problems of large communication volume, many communication rounds and long time-consuming, or the problem that the privacy of the input of participants cannot be guaranteed, so it is difficult to give consideration to both efficiency and privacy.

SUMMARY

The objective of this embodiment of the present disclosure is to provide a multi-party privacy computing method and device based on semi-trusted hardware, so as to solve the technical problems of semi-trusted hardware and large communication volume or multiple communication rounds of multi-party computing technology in related technologies.

According to a first aspect of the embodiment of the present disclosure, a multi-party privacy computing method based on semi-trusted hardware is provided, which is applied to semi-trusted hardware, and includes the following steps.

Acquiring random number masks and random seeds of all user terminals.

Generating a garbled circuit seed according to the random seeds.

Generating a garbled circuit according to a predetermined circuit description and the garbled circuit seed. In an embodiment, the garbled circuit comprises garbled tables, wire labels and decoding information.

Sending the wire labels corresponding to inputs of all user terminals to a user terminal corresponding to the semi-trusted hardware by using an oblivious transfer protocol.

Sending the garbled tables and the decoding information to the user terminal corresponding to the semi-trusted hardware, so that the user terminal can compute an output value according to the garbled tables, the decoding information and the wire labels corresponding to the inputs of all user terminals.

Further, the step of acquiring random number masks and random seeds of all user terminals includes:

Acquiring a random number mask and a random seed of the user terminal corresponding to the semi-trusted hardware.

Acquiring encrypted random number masks and encrypted random seeds of other user terminals through a secure channel between the semi-trusted hardware and other user terminals.

Decrypting the encrypted random number masks and the encrypted random seeds according to a symmetric key between the semi-trusted hardware and each user terminal to obtain decrypted random number masks and decrypted random seeds.

Verifying the decrypted random number masks and the decrypted random seeds.

If the verification is passed, using the decrypted random number masks as the random number masks of other user terminals, and the decrypted random seeds as the random seeds of other user terminals.

Further, the step of generating a garbled circuit according to a predetermined circuit description and the garbled circuit seed includes:

Generating wire labels according to the predetermined circuit description and the garbled circuit seed. In an embodiment, the wire label comprises a plurality of 0 wire labels and 1 wire labels.

Generating a plurality of garbled tables according to the predetermined circuit description, the 0 wire labels and the 1 wire labels. In an embodiment, a number of the garbled tables is the same as a number of Boolean gates in the predetermined circuit description.

Generating a plurality of pieces of decoding information according to the predetermined circuit description and the wire label of a circuit output wire.

Further the step of sending the wire labels corresponding to inputs of all user terminals to a user terminal corresponding to the semi-trusted hardware by using an oblivious transfer protocol includes:

Arranging the wire labels corresponding to the inputs of all user terminals in the garbled circuit according to the random number masks of all user terminals.

Executing a plurality of 1-out-of-2 oblivious transfer protocols according to the arranged input wire labels corresponding to each bit and the encrypted input corresponding to each bit input by the user terminal. In an embodiment, each oblivious transfer protocol corresponds to the input of one bit by the user terminal, so that the semi-trusted hardware sends the wire labels corresponding to all user terminal inputs to the user terminal corresponding to the semi-trusted hardware.

According to a second aspect of the embodiment of the present disclosure, a privacy computing method based on semi-trusted hardware is provided. In an embodiment, the method is applied to a user terminal and comprises the following steps.

Constructing a secure channel with the semi-trusted hardware corresponding to other user terminals using a remote attestation mechanism.

Randomly selecting random number masks and encrypting inputs according to the random number masks.

Sending the encrypted inputs to all other user terminals.

Sending the random number masks to the semi-trusted hardware corresponding to other user terminals via the secure channel, and at the same time directly sending the random number masks to the semi-trusted hardware corresponding to itself.

Randomly selecting a random seed, sending the random seed to the semi-trusted hardware corresponding to other user terminals via the secure channel, and at the same time directly sending the random seed to the semi-trusted hardware corresponding to the user terminal, so that the semi-trusted hardware can obtain the random number masks and random seeds of all user terminals; generating a garbled circuit seed according to the random seeds, and generating a garbled circuit according to a predetermined circuit description and the garbled circuit seed. In an embodiment, the garbled circuit comprises garbled tables, wire labels and decoding information; sending the wire labels corresponding to the inputs of all user terminals to the user terminals corresponding to the semi-trusted hardware by an oblivious transmission protocol, and sending the garbled tables and decoding information to the user terminal corresponding to the semi-trusted hardware.

Acquiring the wire labels corresponding to the inputs of all user terminals from the corresponding semi-trusted hardware by the oblivious transfer protocol.

Acquiring the garbled tables and decoding information from the corresponding semi-trusted hardware.

Computing an output value according to the garbled tables, the decoding information and the wire labels corresponding to the inputs of all user terminals.

According to a third aspect of the embodiment of the present disclosure, a privacy computing device based on semi-trusted hardware is provided. In an embodiment, the device is applied to semi-trusted hardware and includes:

A first acquisition module configured to acquire random number masks and the random seeds of all user terminals.

A first generation module configured to generate a garbled circuit seed according to the random seeds.

A second generation module configured to generate a garbled circuit according to a predetermined circuit description and the garbled circuit seed. In an embodiment, the garbled circuit comprises garbled tables, wire labels and decoding information.

A first sending module configured to send the wire labels corresponding to inputs of all user terminals by using an oblivious transfer protocol.

A second sending module configured to send the garbled tables and decoding information to a user terminal corresponding to the semi-trusted hardware, so that the user terminal can compute an output value according to the garbled tables, decoding information and the wire labels corresponding to the inputs of all user terminals.

Further, generating a garbled circuit according to a predetermined circuit description and the garbled circuit seed includes:

Generating wire labels according to the predetermined circuit description and the garbled circuit seed. In an embodiment, the wire label comprises a plurality of 0 wire labels and 1 wire labels.

Generating a plurality of garbled tables according to the predetermined circuit description, the 0 wire labels and the 1 wire labels. In an embodiment, a number of the garbled tables is the same as a number of Boolean gates in the predetermined circuit description.

Generating a plurality of pieces of decoding information according to the predetermined circuit description and the wire label of a circuit output wire.

According to a fourth aspect of the embodiment of the present disclosure, a privacy computing device based on semi-trusted hardware is provided. In an embodiment, the device is applied to a user terminal and comprises:

A construction module configured to construct a secure channel with the semi-trusted hardware corresponding to other user terminals using a remote attestation mechanism.

An encryption module configured to randomly select random number masks and encrypt inputs according to the random number masks.

A third sending module configured to send the encrypted inputs to all other user terminals.

A fourth sending module configured to send the random number masks to the semi-trusted hardware corresponding to other user terminals via the secure channel, and at the same time directly send the random number masks to the semi-trusted hardware corresponding to itself.

A fifth sending module configured to randomly select a random seed, send the random seed to the semi-trusted hardware corresponding to other user terminals via the secure channel, and at the same time directly send the random seed to the semi-trusted hardware corresponding to the user terminal, so that the semi-trusted hardware can obtain the random number masks and random seeds of all user terminals; generate a garbled circuit seed according to the random seeds, and generate a garbled circuit according to a predetermined circuit description and the garbled circuit seed. In an embodiment, the garbled circuit comprises garbled tables, wire labels and decoding information; send the wire labels corresponding to the inputs of all user terminals to the user terminals corresponding to the semi-trusted hardware by an oblivious transmission protocol, and send the garbled tables and decoding information to the user terminal corresponding to the semi-trusted hardware.

A second acquisition module configured to acquire the wire labels corresponding to the inputs of all user terminals from the corresponding semi-trusted hardware by the oblivious transfer protocol.

A third acquisition module configured to acquire the garbled tables and decoding information from the corresponding semi-trusted hardware.

A computation module configured to compute an output value according to the garbled tables, the decoding information and the wire labels corresponding to the inputs of all user terminals.

According to a fifth aspect of the embodiment of the present disclosure, an electronic device is provided, including:

One or more processors.

A memory for storing one or more programs.

When the one or more programs are executed by the one or more processors, the one or more processors implement the method according to any one of the first or second aspect.

According to a sixth aspect of the embodiment of the present disclosure, a computer readable storage medium on which computer instructions are stored is provided. In an embodiment, the instructions, when executed by a processor, implement the steps of the method according to any one of the first or second aspect.

The technical solution provided by the embodiment of the present disclosure can include the following beneficial effects.

As can be seen from the above embodiments, the present disclosure uses trusted hardware to reduce the communication traffic and communication rounds of multi-party secure computing, so that multiple participants can obtain information such as encrypted input required for computing with low communication traffic and constant communication rounds; the random seeds at the user terminals are used to generate the garbled circuit seed in the semi-trusted hardware, so as to generate the garbled circuit, and the garbled circuit technology is used to prevent the user from acquiring the private input of other participants in the computation process; and an oblivious transfer protocol is used to send the wire labels corresponding to the inputs of all user terminals to the user terminals corresponding to the semi-trusted hardware, which prevents the semi-trusted hardware from acquiring users' private inputs and ensures the security of multi-party computation.

It should be understood that the above general description and the following detailed description are exemplary and explanatory only, and do not limit the present disclosure.

BRIEF DESCRIPTION OF DRAWINGS

The drawings herein are incorporated into and constitute a part of the description. Embodiments consistent with the present disclosure are illustrated and, together with the specification, serve to explain the principle of the present disclosure.

DESCRIPTION OF EMBODIMENTS

Here, exemplary embodiments will be described in detail, examples of which are shown in the accompanying drawings. When the following description refers to the drawings, unless otherwise indicated, the same numbers in different drawings indicate the same or similar elements. The embodiments described in the following exemplary embodiments do not represent all the embodiments consistent with this application. On the contrary, they are only examples of devices and methods consistent with some aspects of this application as detailed in the appended claims.

The terminology used in this application is for the purpose of describing specific embodiments only, and is not intended to limit this application. The singular forms of "a", "said" and "the" used in this application and the appended claims are also intended to include plural forms, unless the context clearly indicates other meaning. It should also be understood that the term "and/or" used herein refers to and includes any or all possible combinations of one or more associated listed items.

It should be understood that although the terms first, second, third, etc. may be used in this application to describe various information, these information should not be limited to these terms. These terms are only used to distinguish the same type of information from each other. For example, without departing from the scope of this application, the first piece of information can also be called the second piece of information, and similarly, the second piece of information can also be called the first piece of information. Depending on the context, the word "if" as used here can be interpreted as "when" or "when" or "in response to a determination".

First, the semi-trusted hardware is explained:

In the prior art, trusted hardware can directly get the privacy input of all user terminals, but when the hardware manufacturer is not trusted, it can steal the privacy information of user terminals and change the computation process by embedding the backdoor. For example, hardware manufacturers can embed information in cryptographic measures generated by trusted hardware by electronic steganography. When remote participants forward the cryptographic measures to a third-party authentication server provided by hardware manufacturers, hardware manufacturers can obtain private information from them. When the user calls the trusted hardware for computation, the hardware manufacturer can specify its running result at will. In such a scenario, the trusted hardware still plays a protective role for the protocol participants: the local participants cannot get the private input of the remote participants by attacking the trusted hardware, nor can they control the computation process of the trusted hardware and tamper with the computation results of the trusted hardware; however, hardware manufacturers have the ability to obtain the privacy input sent by users to trusted hardware and change the output results of trusted hardware, so such hardware is called as semi-trusted hardware.

In the specific implementation process of the present disclosure, the semi-trusted hardware can be placed inside the user terminal or can establish a high-speed connection with the user terminal. Compared with the characteristics of high latency and low bandwidth of network transmission, placing the semi-trusted hardware inside the user terminal or establishing a high-speed connection between the semi-trusted hardware and the user terminal can enable the semi-trusted hardware and the user terminal to communicate and transmit data in a low latency and high bandwidth channel, thus improving the overall performance of the protocol.

Suppose n users want to jointly compute a function (this function can be a certain function or service) without revealing the private input of each user. These users are recorded as $P_1, \ldots, P_n$. Each user $P_i$ owns a trusted hardware device $T_i$, but they do not want to reveal the privacy input of each user to this trusted hardware. To achieve the above requirements, users $P_1, \ldots, P_n$ can use secure multi-party computing technology and compute functions through the secure multi-party computing method based on trusted hardware shown below.

Figure 1:
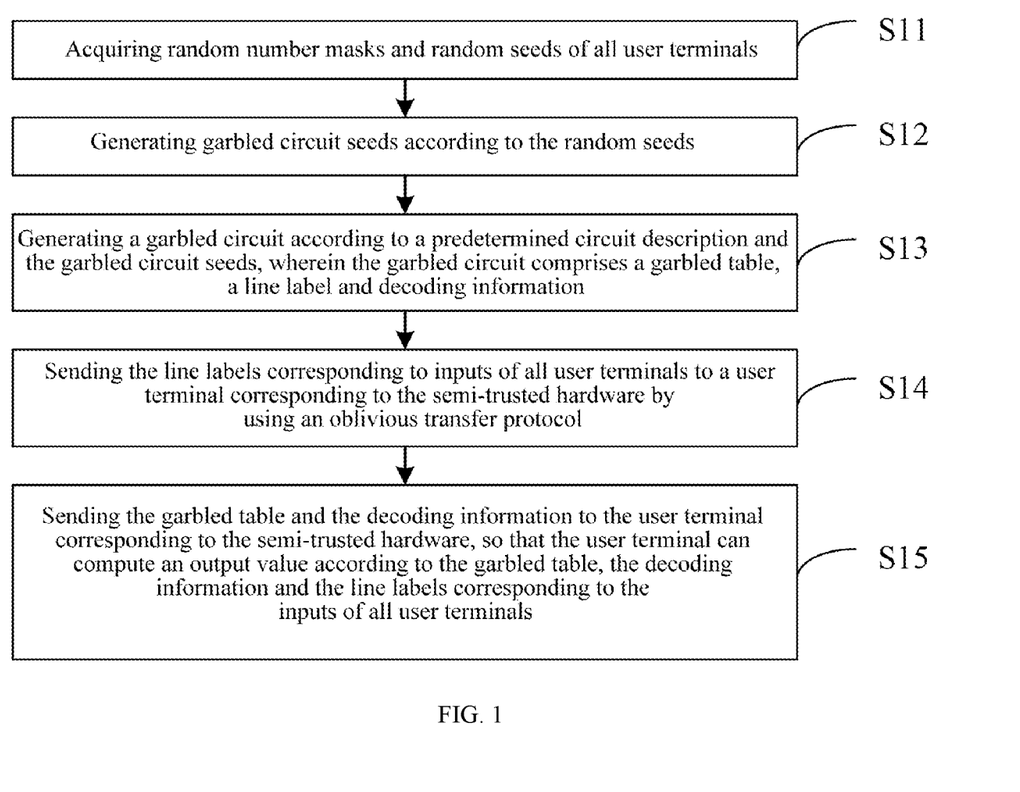
FIG. 1 is a flowchart of a multi-party privacy computing method based on semi-trusted hardware (applied to semi-trusted hardware) according to an exemplary embodiment.

FIG. 1 is a flowchart of a multi-party privacy computing method based on semi-trusted hardware according to an exemplary embodiment. As shown in FIG. 1, the method is applied to semi-trusted hardware and can include the following steps:

S11, acquiring random number masks and random seeds of all user terminals;

S12, generating a garbled circuit seed according to the random seeds;

S13, generating a garbled circuit according to a predetermined circuit description and the garbled circuit seed. In an embodiment, the garbled circuit comprises garbled tables, wire labels and decoding information;

S14, sending the wire labels corresponding to inputs of all user terminals to a user terminal corresponding to the semi-trusted hardware by using an oblivious transfer protocol; and S15, sending the garbled tables and the decoding information to the user terminal corresponding to the semi-trusted hardware, so that the user terminal can compute an output value according to the garbled tables, the decoding information and the wire labels corresponding to the inputs of all user terminals.

As can be seen from the above embodiments, the present disclosure uses trusted hardware to reduce the communication traffic and communication rounds of multi-party secure computing, so that multiple participants can obtain information such as encrypted input required for computing with low communication traffic and constant communication rounds; the random seeds at the user terminal are used to generate the garbled circuit seed, so as to generate the garbled circuit, and the garbled circuit technology is used to prevent the user from acquiring the private input of other participants in the computation process; an oblivious transfer protocol is used to send the wire labels corresponding to the inputs of all user terminals to the user terminals corresponding to the semi-trusted hardware, which prevents the semi-trusted hardware from acquiring users' private inputs and ensures the security of multi-party computing.

In the concrete implementation of step S11, the random number masks and random seeds of all user terminals are obtained.

Figure 2:
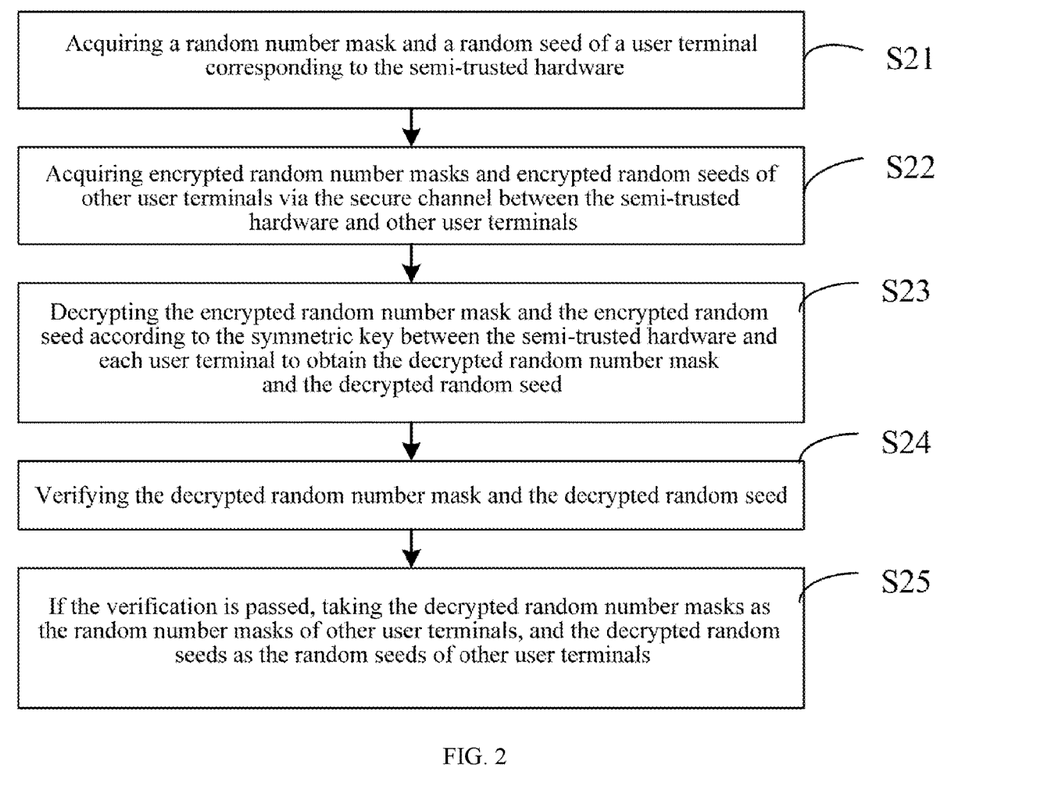
FIG. 2 is a flowchart of step S11 according to an exemplary embodiment.

In an embodiment, as shown in FIG. 2, this step may include the following sub-steps:

S21, acquiring a random number mask and a random seed of a user terminal corresponding to the semi-trusted hardware.

In an embodiment, since the semi-trusted hardware can be placed inside the user terminal or can establish a high-speed connection with the user terminal, the user terminal can directly send its random number mask and random seed to the corresponding semi-trusted hardware, so the semi-trusted hardware can directly obtain the random number mask and random seed of the corresponding user terminal.

S22, acquiring encrypted random number masks and encrypted random seeds of other user terminals via the secure channel between the semi-trusted hardware and other user terminals.

In an embodiment, the encrypted random number mask and the encrypted random seed of the user terminal $P_i$ acquired by the semi-trusted hardware $T_j$ are obtained by encrypting the random number mask $m_i$ and the random seed $s_i$ with a symmetric key $k_{i,j}$ obtained by the user terminal $P_i$ after remote authentication by the user terminal $P_i$ and the semi-trusted hardware $T_j$ by using a symmetric encryption algorithm with message integrity check; the purpose of this step is to enable each user terminal $P_i$ to communicate indirectly with the semi-trusted hardware of all other user terminals, to prevent a certain user terminal from stealing the random number masks of other user terminals and further obtaining the privacy inputs of other user terminals, and to prevent a certain user terminal from stealing the random seeds of all other user terminals and further obtaining the garbled circuit seed, generating a garbled circuit and stealing the privacy inputs of other user terminals.

S23, decrypting the encrypted random number mask and the encrypted random seed according to the symmetric key between the semi-trusted hardware and each user terminal to obtain the decrypted random number mask and the decrypted random seed;

S24, verifying the decrypted random number mask and the decrypted random seed;

S25, if the verification is passed, if the verification is passed, using the decrypted random number masks as the random number masks of other user terminals, and the decrypted random seeds as the random seeds of other user terminals.

In an embodiment, in the concrete implementation of steps S23-S25, the semi-trusted hardware $T_j$ uses the symmetric key of the user terminal $P_i$ and the semi-trusted hardware $T_j$ as a decryption key, and uses the encrypted random number mask and the encrypted random seed as the ciphertext respectively, and calls the decryption algorithm corresponding to the symmetric encryption algorithm with the message verification code used by the user terminal $P_i$ to decrypt; the encryption algorithm will check the integrity of the message; if the verification passes, plaintext random number mask and the random seed are output respectively; the function of this step is to allow the semi-trusted hardware $T_j$ corresponding to the user terminal $P_j$ to receive the random number mask and random seed sent by the user terminal $P_j$, and prevent the user terminal $P_j$ from tampering with the random number mask or random seed.

In the specific implementation of step S12, a garbled circuit seed is generated according to the random seed;

In an embodiment, each semi-trusted hardware $T_i$ holds n random seeds $s_1, \ldots, s_n$ at this time, and these n random seeds are processed according to the same algorithm to obtain a garbled circuit seed s'.

In an embodiment, all the n random seeds can be subjected to XOR. As long as one participant is honest, the random seed he chooses is the real random number, then the XOR result looks indistinguishable from the real random number.

In another embodiment, the same hash algorithm H can be used to calculate the garbled circuit seed $s'=H(s_1, \ldots, s_n)$.

In another embodiment, a pseudorandom function (PRF) can be used to compute the garbled circuit seed, $t_1=PRF(s_1, 0)$, $t_2=PRF(s_2, t_1), \ldots, t_n=PRF(s_n, t_{n-1})$, $s'=t_n$. Given the security parameter c, the pseudo-random function is a deterministic function PRF: $K \times X \rightarrow Y$ defined on (K,X,Y) that can be calculated in polynomial time based on c, where K is the key space, that is, the space composed of all strings of a length c, X is the input space, and Y is the output space. Pseudo-random functions cannot be distinguished from real random functions. Specifically, the function space formed by all functions defined in the input space X and the output space Y is recorded as F. For an arbitrary key k in K and an arbitrary function f in F, pseudo-random functions PRF(k, •) and f(•) cannot be distinguished in polynomial time. Because each random seed contributes randomness to the generation of the garbled circuit seed in the same way, as long as one participant is honest, that is, the random seed he chooses is a real random number, then the garbled circuit seed cannot be distinguished from the real random number, and the dishonest participant cannot predict the content of the garbled circuit seed.

The practice of this step only needs to ensure that each random seed provides randomness for the generation process of the garbled circuit seed.

Figure 3:
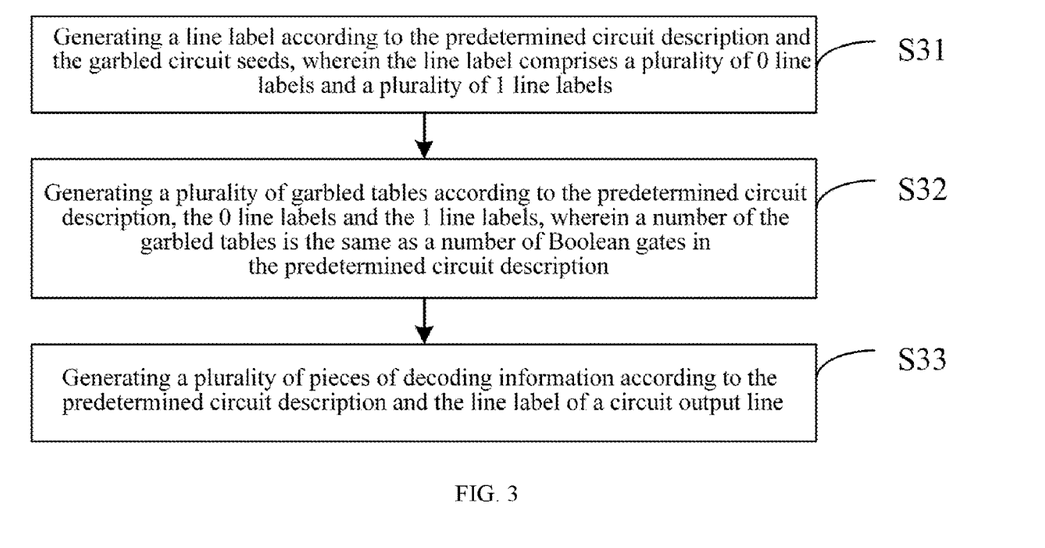
FIG. 3 is a flowchart of step S13 according to an exemplary embodiment.

In the specific implementation of step S13, a garbled circuit is generated according to the predetermined circuit description and the garbled circuit seed, and the garbled circuit includes garbled tables, wire labels and decoding information;

In an embodiment, as shown in FIG. 3, this step may include the following sub-steps:

S31, generating wire labels according to the predetermined circuit description and the garbled circuit seed. In an embodiment, the wire label comprises a plurality of 0 wire labels and 1 wire labels;

S32, generating a plurality of garbled tables according to the predetermined circuit description, the 0 wire labels and the 1 wire labels. In an embodiment, a number of the garbled tables is the same as a number of Boolean gates in the predetermined circuit description;

S33, generating a plurality of pieces of decoding information according to the predetermined circuit description and the wire label of a circuit output wire.

In an embodiment, in the specific implementation of step S31-step S33, a variety of optimized implementations of garbled circuits can be used to generate the wire label, garbled table and decoding information.

In an embodiment, the basic implementation of garbled circuit can be adopted. In order to generate wire labels, according to the predetermined circuit description, the pseudo-random function is called by using the garbled circuit seed, i is traversed from 1 to the number of wires in the predetermined circuit description; $T_i^0=PRF(s', i\|0)$ is calculated, and the first 40 bits of $T_i^0$ are set to 0, so as to obtain $W_i^0$ as the 0 wire label of the $i^{th}$ wire; $T_i^1=PRF(s', i\|1)$ is calculated, and the first 40 bits of $T_i^1$ are set to 0, so as to obtain $W_i^1$ as the 1 wire label of the $i^{th}$ wire. In order to generate the garbled tables, according to the predetermined circuit description, each Boolean gate in the predetermined circuit description is traversed in topological order, and the corresponding garbled table is generated by using the wire label according to its truth table. For example, for an AND gate $c=a \wedge b$, the symmetric encryption algorithm Enc and hash function H are respectively called to calculate $Enc(H(W_a^0, W_b^0), W_c^0)$, $Enc(H(W_a^0, W_b^1), W_c^0)$, $Enc(H(W_a^1, W_b^0), W_c^0)$ and $Enc(H(W_a^1, W_b^1), W_c^1)$, and then these four ciphertexts are randomly scrambled as the garbled tables of this gate. In order to generate the decoding information, according to the predetermined circuit description, i is traversed in the output wire range of the circuit, $Enc(W_i^0, 0)$ and $Enc(W_i^1, 1)$ are calculated, and the combination of these two ciphertexts is used as the decoding information corresponding to the wire i.

In another embodiment, the point-and-permute optimization of the garbled circuit can be adopted. In order to generate wire labels, according to the predetermined circuit description, the pseudo-random function is called by using the garbled circuit seed, i is traversed from 1 to the number of wires in the predetermined circuit description; $W_i^0=T_i^0=PRF(s', i\|0)$ is calculated as the 0 wire label $W_i^0$ of the $i^{th}$ wire, and meanwhile the last bit of $T_i^0$ is recorded as the 0 selection bit $p_i^0$ of the $i^{th}$ wire; $T_i^1=PRF(s', i\|1)$ is calculated, and the 1 selection bit of the $i^{th}$ wire is set as $p_i^1=!p_i^0$, that is, opposite to $p_i^0$; the first c-1 bits of $T_i^1$ are combined with $p_i^1$ as the 1 wire label $W_i^1$ of the $i^{th}$ wire. To generate the garbled tables, according to the predetermined circuit description, each Boolean gate in the predetermined circuit description is traversed in topological order, and the corresponding garbled table is generated by using the wire label according to its truth table. For example, for the AND gate $c=a \wedge b$, the hash function H is called to calculated $H(W_a^0, W_b^0) \oplus W_c^0$, $H(W_a^0, W_b^1) \oplus W_c^0$, $H(W_a^1, W_b^0) \oplus W_c^0$ and $H(W_a^1, W_b^1) \oplus W_c^1$, and this ciphertext $H(W_a^{v_a}, W_b^{v_b}) \oplus W_c^{v_a \wedge v_b}$ is placed at the $(2p_a^{v_a}+p_b^{v_b}+1)^{th}$ position to form the garbled tables of the gate. In order to generate the decoding information, according to the predetermined circuit description, i is traversed in the output wire range of the circuit, and $p_i^0$ is used as the decoding information corresponding to the wire i.

The advantage of using garbled circuit technology for computation is that the information that the user terminal can get is only the wire label, garbled table and decoding information. When the user decrypts the garbled tables, it can be defined that he can only get one wire label (0 wire label or 1 wire label) for each gate input wire, so he can only correctly decrypt a ciphertext in the garbled tables and get an output wire label. Because the wire label is generated by pseudo-random function, it cannot be distinguished from the real random number, and the user cannot tell whether it corresponds to 0 or 1 from the wire label, so it cannot get the private input of other user terminals. After the computation of the whole circuit is completed, the user terminal holds wire labels for each output wire, and he can use the decoded information to get the value of each output wire, i.e., the output result of the whole circuit is obtained.

In the concrete implementation of step S14, the wire labels corresponding to the inputs of all user terminals are sent to the user terminals corresponding to the semi-trusted hardware by using the oblivious transfer protocol.

Figure 4:
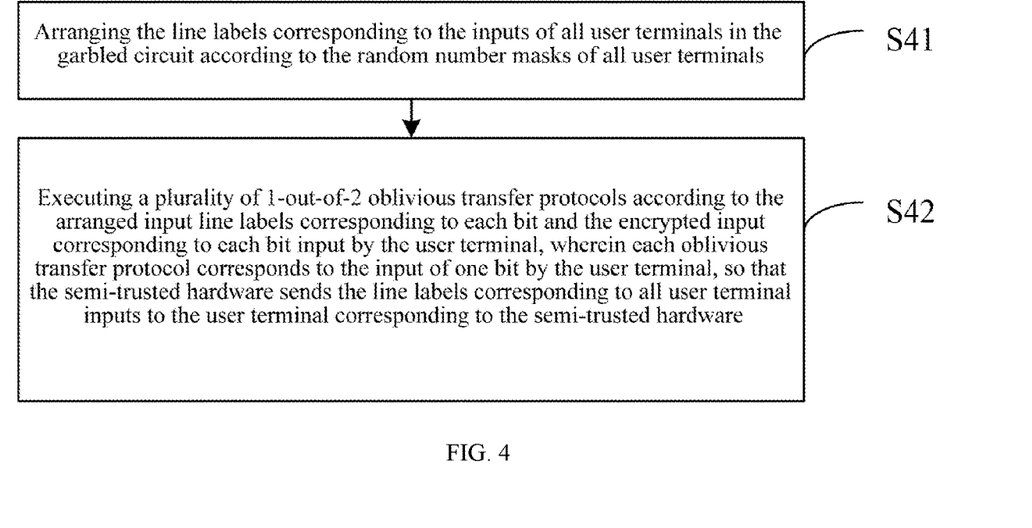
FIG. 4 is a flowchart of step S14 according to an exemplary embodiment.

In an embodiment, as shown in FIG. 4, this step may include the following sub-steps:

S41, arranging the wire labels corresponding to the inputs of all user terminals in the garbled circuit according to the random number masks of all user terminals;

In an embodiment, i is traversed from 1 to the number of input wires in the predetermined circuit description; if the $i^{th}$ bit random number mask $m_i=0$, the wire label corresponding to the $i^{th}$ bit input is $\overline{W}_i^0 = W_i^0$, $\overline{W}_i^1 = W_i^1$ after arranging, and if the $i^{th}$ bit random number mask $m_i = 1$, the wire label corresponding to the $i^{th}$ bit input is $\overline{W}_i^0 = W_i^1$, $\overline{W}_i^1 = W_i^0$ after arranging. Since the input of the user terminal is encrypted input by using a random number mask in an XOR mode, the semi-trusted hardware arranges the wire labels in such a mode, so that the user terminal can be ensured to obtain the wire labels corresponding to the unencrypted real input.

S42: executing a plurality of 1-out-of-2 oblivious transfer protocols according to the arranged input wire labels corresponding to each bit and the encrypted input corresponding to each bit input by the user terminal. In an embodiment, each oblivious transfer protocol corresponds to the input of one bit by the user terminal, so that the semi-trusted hardware sends the wire labels corresponding to all user terminal inputs to the user terminal corresponding to the semi-trusted hardware.

In an embodiment, the semi-trusted hardware sends the wire label corresponding to the $i^{th}$ bit input to the user terminal corresponding to the semi-trusted hardware by traversing i from 1 to the number of input wires in the predetermined circuit description with a variety of 1-out-of-2 oblivious transfer protocols, and at the same time, the semi-trusted hardware cannot know the input value of the user terminal, and the user terminal can only get the wire label corresponding to the input.

In an embodiment, a 1-out-of-2 oblivious transfer protocol based on an RSA encryption algorithm can be adopted. The semi-trusted hardware generates two pairs of RSA public key and private key pairs ($pk_0$, $sk_0$) and ($pk_1$, $sk_1$), and sends the public keys $pk_0$ and $pk_1$ to the corresponding user terminal. For the $i^{th}$ bit input, the user terminal holds the encrypted input $c_i$, he randomly selects a piece of secret information $r_i$, encrypts $r_i$ with the public key $pk_{c_i}$, and sends the encrypted result to the semi-trusted hardware; the semi-trusted hardware decrypts the ciphertext sent by the user terminal by using the private keys $sk_0$ and $sk_1$ to obtain two decryption results $k_i^0$ and $k_i^1$ respectively, and the semi-trusted hardware calculates $e_i^0 = \overline{W}_i^0 \oplus k_i^0$ and $e_i^1 = \overline{W}_i^1 \oplus k_i^1$ and sends $e_i^0$ and $e_i^1$ to the user terminal; the user terminal decrypts $e_i^{c_i}$ using the secret information $r_i$ to obtain $\overline{W}_i^{c_i} = W_i^{m_i \oplus c_i} = W_i^{x_i}$ as the wire label corresponding to the $i^{th}$ bit input; the reliability of RSA algorithm is based on the mathematical assumption that it is difficult to factorize the large integer, so it can be guaranteed that the user cannot get the private key from the public key and then get $k_i^{c_i}$, and thus the user cannot get two pieces of information sent by semi-trusted hardware at the same time. On the other hand, the semi-trusted hardware cannot distinguish which public key is used to select from the decrypted sum, so it cannot get $c_i$ input by the user terminal.

In another embodiment, a 1-out-of-2 oblivious transfer protocol based on discrete logarithm can be adopted. The semi-trusted hardware and user terminal hold two globally public parameters, a prime number p and an integer g, g being a primitive root of p. The semi-trusted hardware randomly selects a number a between 1 and p−1 as its key, calculates $A = g^a$ mod p at the same time, and sends A to user terminal. For the $i^{th}$ bit input, the user terminal holds the encrypted input $c_i$, and he randomly selects a number $b_i$ between 1 and p−1 as its key; if $c_i = 0$, he calculates $B_i = g^{b_i}$ mod p, if $c_i = 1$, he calculates $B_i = A g^{b_i}$ mod p, the user terminal will send $B_i$ to the semi-trusted hardware and compute $k_i^R = H(A^{b_i})$ at the same time; the semi-trusted hardware calculates $k_i^0 = H(B_i^a)$ and $$k_i^1 = H\left(\left(\frac{B_i}{A}\right)^a\right)$$

after receiving $B_i$, calculates the encrypted results $e_i^0 = \overline{W}_i^0 \oplus k_i^0$ and $e_i^1 = \overline{W}_i^1 \oplus k_i^1$, and sends $e_i^0$ and $e_i^1$ to the user terminal; the user terminal decrypts $e_i^{c_i}$ using the secret information $k_i^R$ to obtain $\overline{W}_i^{c_i} = W_i^{m_i \oplus c_i} = W_i^{x_i}$ as the wire label corresponding to the $i^{th}$ bit input. The security of the protocol depends on CDH assumption and the hash function being a random oracle machine, so the user can only get one decryption key, and cannot get two pieces of information sent by semi-trusted hardware at the same time, while the semi-trusted hardware cannot get $ic_i$ from $B_i$.

In the specific implementation of step S15, the garbled tables and the decoding information are sent to the user terminal corresponding to the semi-trusted hardware, so that the user terminal can compute the output value according to the garbled tables, the decoding information and the wire labels corresponding to the inputs of all user terminals.

In an embodiment, the process that the user terminal calculates the output value according to the garbled tables, the decoding information and the wire labels corresponding to all user terminal inputs corresponds to the above-mentioned garbled circuit generation process. For the basic implementation of garbled circuit, the user terminal calculates each Boolean gate in the predetermined circuit description according to the topological order. For each Boolean gate, the user terminal holds two wire labels corresponding to its two input wires and garbled tables consisting of four ciphertexts. For example, for the AND gate $c = a \wedge b$, the user terminal holds the wire labels $W_a$ and $W_b$. He calculates $H(W_a, W_b)$ and tries to use $H(W_a, W_b)$ to call the Decryption algorithm Dec corresponding to the symmetric Encryption algorithm Enc to decrypt the four ciphertexts in the garbled tables. If the first 40 bits of the decryption result are all 0, there is a probability close to 1 that he gets the correct output wire label $W_c$. After all Boolean gate computations are completed, the user terminal traverses i within the range of the output wires described in the predetermined circuit description using the decoding information and the wire labels corresponding to all the output wires in the predetermined circuit description, and calls the decryption algorithm corresponding to the symmetric encryption algorithm Enc with the wire label $W_i$ to decrypt two ciphertexts in the decoding information corresponding to the wire i. If the decryption results in 0 or 1, the value of the wire i is the decryption result. In the process of computing the garbled tables, since computation is implemented according to the circuit topology order, the user terminal always gets two input wire labels corresponding to the two input wires of a Boolean gate when computing the Boolean gate, and since it is a small probability event that the first 40 bits of a random string are all 0, when the first 40 bits of the decryption result are all 0, there is a probability close to 1 that user terminal gets the correct output wire label.

For the implementation of garbled circuit optimized by point-and-permute, the user terminal calculates each Boolean gate in the predetermined circuit description according to the topological order. For each Boolean gate, the user terminal holds two wire labels corresponding to its two input wires and garbled tables composed of four ciphertexts. For example, for the AND gate $c = a \wedge b$, the user terminal holds the wire labels $W_a$ and $W_b$, and he extracts the last selection bit $p_a$ and $p_b$ from $W_a$ and $W_b$, and he calculates $H(W_a, W_b)$ and decrypts the $2p_a + p_b + 1^{th}$ ciphertext by XOR to obtain the output wire label $W_c$. After all Boolean gate computations are completed, the user terminal traverses i within the range of the output wires described in the predetermined circuit description using the wire labels corresponding to all the output wires and decoding information in the predetermined circuit description, extracts the last selection bit $p_i$ from the wire label $W_i$ and compares it with the decoding information corresponding to wire i. If they are the same, the value of wire i is 0, otherwise, the value of wire i is 1.

Corresponding to the aforementioned embodiment of a multi-party privacy computing method based on semi-trusted hardware, this application also provides an embodiment of a multi-party privacy computing device based on semi-trusted hardware.

Figure 5:
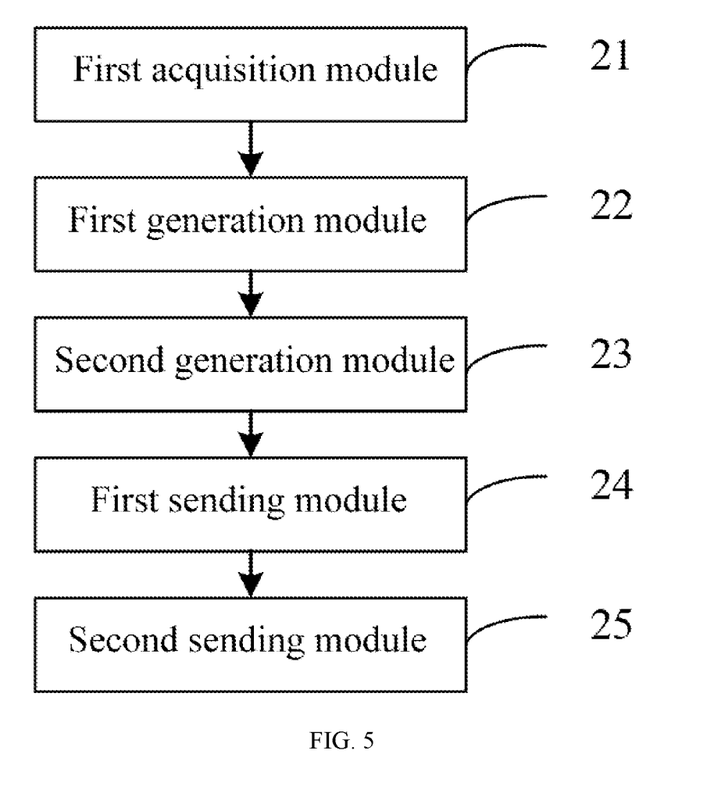
FIG. 5 is a block diagram of a multi-party privacy computing device based on semi-trusted hardware (applied to semi-trusted hardware) according to an exemplary embodiment.

FIG. 5 is a block diagram of a multi-party privacy computing device based on semi-trusted hardware according to an exemplary embodiment. Referring to FIG. 5, the device is applied to semi-trusted hardware, and may include:

A first acquisition module 21 used to acquire random number masks and random seeds of all user terminals.

A first generation module 22 used to generate a garbled circuit seed according to the random seeds.

A second generation module 23 used to generate a garbled circuit according to a predetermined circuit description and the garbled circuit seed. In an embodiment, the garbled circuit comprises garbled tables, wire labels and decoding information.

A first sending module 24 used to send the wire labels corresponding to inputs of all user terminals by using an oblivious transfer protocol.

A second sending module 25 used to send the garbled tables and decoding information to a user terminal corresponding to the semi-trusted hardware, so that the user terminal can compute an output value according to the garbled tables, decoding information and the wire labels corresponding to the inputs of all user terminals.

Figure 6:
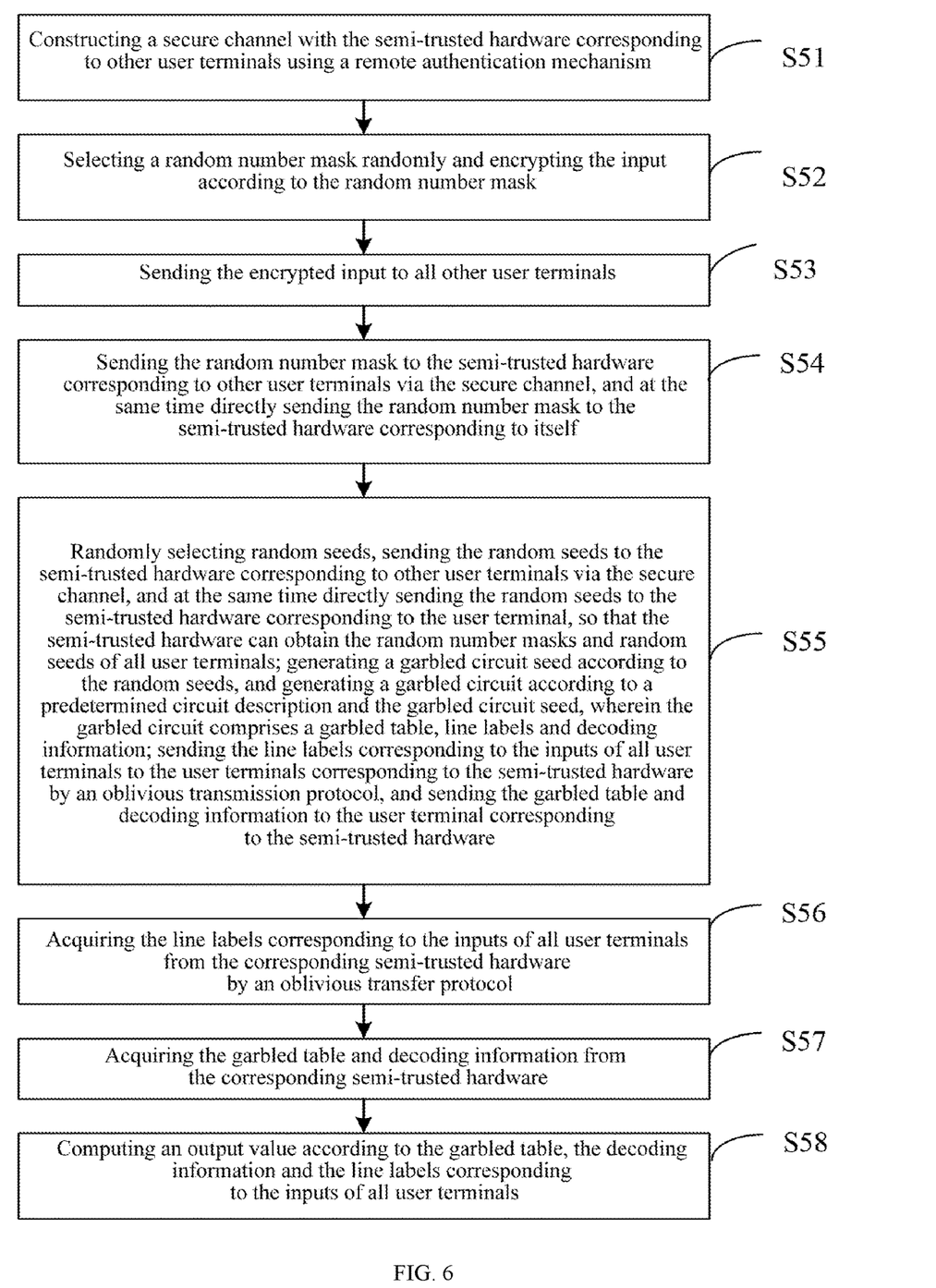
FIG. 6 is a flowchart of a multi-party privacy computing method based on semi-trusted hardware (applied to the user terminal) according to an exemplary embodiment.

FIG. 6 is a flowchart of a multi-party privacy computing method based on semi-trusted hardware according to an exemplary embodiment. As shown in FIG. 6, the method is applied to a user terminal and may include the following steps:

S51, constructing a secure channel with the semi-trusted hardware corresponding to other user terminals using a remote attestation mechanism.

In an embodiment, the remote attestation mechanism allows the user to verify the availability and authenticity of remote semi-trusted hardware. According to the remote authentication rules formulated by hardware manufacturers, each user initiates multiple rounds of challenge requests to other user terminals, and other user terminals respond to these requests by calling their own semi-trusted hardware. The user who initiated the challenge requests verifies the semi-trusted hardware of other user terminals by communicating with a third-party trusted server provided by hardware manufacturers. After remote authentication, each participant holds a symmetric key together with the semi-trusted hardware of each other user, which can be used for encrypted one-to-one communication. The purpose of this step is to enable user $P_i$ to safely transmit data to trusted hardware $\{T_j\}_{j \neq i}$ of other users $\{P_j\}_{j \neq i}$ without worrying that other users may obtain the data.

S52, randomly selecting a random number mask and encrypting the input according to the random number mask.

In an embodiment, the user terminal $P_i$ randomly selects a mask $m_i$ to hide its own input as $c_i = m_i \oplus x_i$, and because other user terminals $\{P_j\}_{j \neq i}$ cannot know $m_i$, even if the user terminal $P_i$ sends $c_i$ to other user terminals, they cannot know the privacy input $x_i$ of the user terminal $P_i$.

S53, sending the encrypted input to all other user terminals.

In an embodiment, the encrypted input $c_i$ is sent to all other user terminals $\{P_j\}_{j \neq i}$. In this step, each user terminal can finally know the encrypted inputs of all user terminals, so it can execute the oblivious transfer protocol with its corresponding semi-trusted hardware, thus acquiring the wire labels corresponding to the inputs of all user terminals, and then computing the garbled circuit to obtain the output results.

S54, sending the random number mask to the semi-trusted hardware corresponding to other user terminals via the secure channel, and at the same time directly sending the random number mask to the semi-trusted hardware corresponding to itself.

In an embodiment, after remote authentication, the semi-trusted hardware $T_j$ corresponding to each user terminal $P_i$ and other user terminals obtain a common symmetric key $k_{i,j}$. The user terminal $P_i$ uses a symmetric encryption algorithm with message integrity check to encrypt the random number mask $m_i$ by $k_{i,j}$ and then sends it to the user $P_j$, who passes the encrypted random number mask to $T_j$. In this embodiment, the encryption with the symmetric key is actually the implementation of the secure channel. Because the symmetric key is only known by Pi and $T_j$, $P_j$ or anyone else cannot decrypt the ciphertext to obtain the plaintext therein; furthermore, the symmetric encryption algorithm used has the function of message integrity check, $T_j$ can also check the message, thus playing the role of a secure channel. The purpose of this step is to enable every semi-trusted hardware to obtain the random number masks of all user terminals, and to prevent a certain user terminal from stealing the random number masks of other user terminals.

S55, randomly selecting a random seed, sending the random seed to the semi-trusted hardware corresponding to other user terminals via the secure channel, and at the same time directly sending the random seed to the semi-trusted hardware corresponding to the user terminal, so that the semi-trusted hardware can obtain the random number masks and random seeds of all user terminals; generating a garbled circuit seed according to the random seeds, and generating a garbled circuit according to a predetermined circuit description and the garbled circuit seed. In an embodiment, the garbled circuit comprises garbled tables, wire labels and decoding information; sending the wire labels corresponding to the inputs of all user terminals to the user terminals corresponding to the semi-trusted hardware by an oblivious transmission protocol, and sending the garbled tables and decoding information to the user terminal corresponding to the semi-trusted hardware.

In an embodiment, after remote authentication, the user terminal $P_i$ and the semi-trusted hardware $T_j$ obtain a common symmetric key $k_{i,j}$. The user terminal $P_i$ uses a symmetric encryption algorithm with message integrity check to encrypt the random seed $s_i$ by $k_{i,j}$ and then sends it to the user $P_j$, and the user $P_j$ passes the encrypted random seed to $T_j$, so that the semi-trusted hardware $T_j$ can perform the operations from step S11 to step S15. The purpose of this step is to enable every semi-trusted hardware to get the random seeds of all user terminals, and to prevent a certain user terminal from stealing the random seeds of other user terminals.

S56, acquiring the wire labels corresponding to the inputs of all user terminals from the corresponding semi-trusted hardware by an oblivious transfer protocol.

In an embodiment, the process of oblivious transfer protocol has already been described in step S42, which will not be repeated here.

S57, acquiring the garbled tables and decoding information from the corresponding semi-trusted hardware.

In an embodiment, according to the predetermined circuit description, the semi-trusted hardware sends the garbled tables corresponding to each Boolean gate to the user terminal according to the circuit topology order, and then sends the decoding information corresponding to each circuit output wire to the user terminal.

S58, computing an output value according to the garbled tables, the decoding information and the wire labels corresponding to the inputs of all user terminals.

In an embodiment, the computation process has been described in step S15, which will not be repeated here.

Corresponding to the aforementioned embodiment of multi-party privacy computing method based on semi-trusted hardware, this application also provides an embodiment of a multi-party privacy computing device based on semi-trusted hardware.

Figure 7:
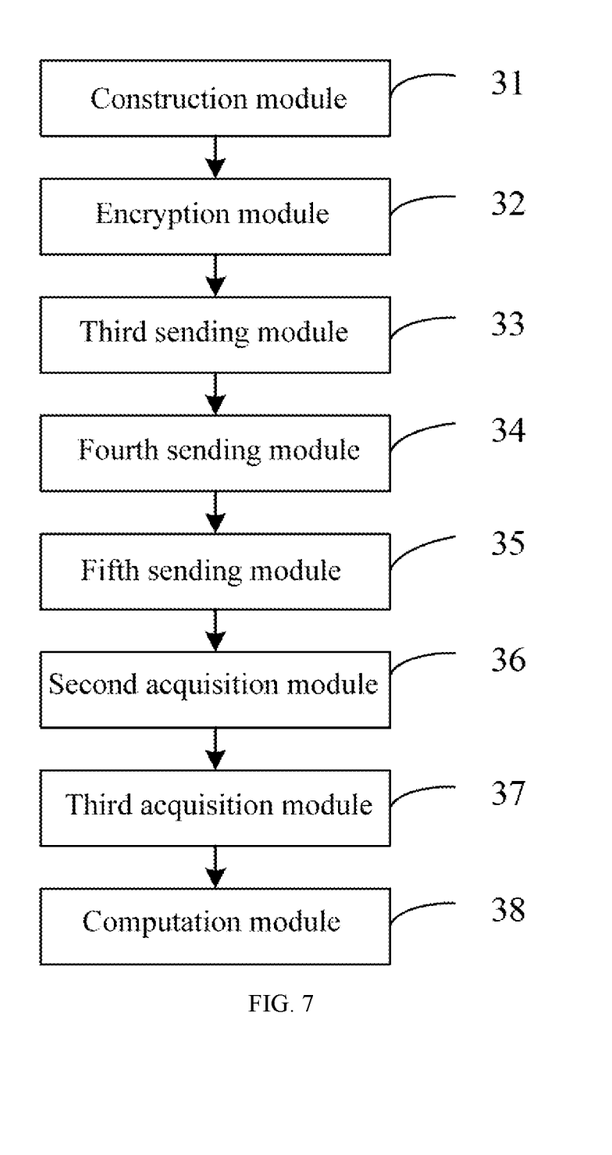
FIG. 7 is a block diagram of a multi-party privacy computing device based on semi-trusted hardware (applied to the user terminal) according to an exemplary embodiment.

FIG. 7 is a block diagram of a multi-party privacy computing device based on semi-trusted hardware according to an exemplary embodiment. Referring to FIG. 7, the device is applied to the user terminal, and may include:

A construction module 31 used to construct a secure channel with the semi-trusted hardware corresponding to other user terminals using a remote attestation mechanism.

An encryption module 32 used to randomly select random number masks and encrypt inputs according to the random number masks.

A third sending module 33 used to send the encrypted inputs to all other user terminals.

A fourth sending module 34 used to send the random number masks to the semi-trusted hardware corresponding to other user terminals via the secure channel, and at the same time directly send the random number masks to the semi-trusted hardware corresponding to itself.

A fifth sending module 35 used to randomly select a random seed, send the random seed to the semi-trusted hardware corresponding to other user terminals via the secure channel, and at the same time directly send the random seed to the semi-trusted hardware corresponding to the user terminal, so that the semi-trusted hardware can obtain the random number masks and random seeds of all user terminals; generate a garbled circuit seed according to the random seeds, and generate a garbled circuit according to a predetermined circuit description and the garbled circuit seed. In an embodiment, the garbled circuit comprises garbled tables, wire labels and decoding information; send the wire labels corresponding to the inputs of all user terminals to the user terminals corresponding to the semi-trusted hardware by an oblivious transmission protocol, and send the garbled tables and decoding information to the user terminal corresponding to the semi-trusted hardware.

A second acquisition module 36 used to acquire the wire labels corresponding to the inputs of all user terminals from the corresponding semi-trusted hardware by the oblivious transfer protocol.

A third acquisition module 37 used to acquire the garbled tables and decoding information from the corresponding semi-trusted hardware.

A computation module 38 used to compute an output value according to the garbled tables, the decoding information and the wire labels corresponding to the inputs of all user terminals.

With regard to the device in the above embodiment, the specific way in which each module performs operations has been described in detail in the embodiment of the method, and will not be explained in detail here.

As for the device embodiment, it basically corresponds to the method embodiment, so please refer to the part of the description of the method embodiment. The above-described device embodiments are only schematic, in which the units described as separate components may or may not be physically separated, and the components displayed as units may or may not be physical units, that is, they may be located in one place or distributed over multiple network units. Some or all of the modules can be selected according to the actual needs to achieve the purpose of the present disclosure solution. Those skilled in the art can understand and implement it without creative labor.

Accordingly, the present disclosure also provides an electronic device, which includes one or more processors; a memory for storing one or more programs. In an embodiment, when the one or more programs are executed by the one or more processors, the one or more processors implement the multi-party privacy computing method based on semi-trusted hardware as described above.

Accordingly, the present disclosure also provides a computer readable storage medium on which computer instructions are stored. In an embodiment, when executed by a processor, the instructions implement the multi-party privacy computing method based on semi-trusted hardware as described above.

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The steps of the method or algorithm described combined with the embodiments of the present disclosure may be implemented in a hardware manner, or may be implemented in a manner in which a processor executes software instructions. The software instructions may consist of corresponding software modules, and the software modules can be stored in Random Access Memory (RAM), flash memory, Read Only Memory (ROM), Erasable Programmable ROM (EPROM), Electrically Erasable Programmable Read-Only Memory (EEPROM), registers, hard disks, removable hard disks, CD-ROMs or any other forms of storage media well-known in the art. An exemplary storage medium is coupled to the processor, such that the processor can read information from, and write information to, the storage medium. The storage medium can also be an integral part of the processor. The processor and storage medium may reside in an Application Specific Integrated Circuit (ASIC). Alternatively, the ASIC may be located in a node device, such as the processing node described above. In addition, the processor and storage medium may also exist in the node device as discrete components.

It should be noted that when the data compression apparatus provided in the foregoing embodiment performs data compression, division into the foregoing functional modules is used only as an example for description. In an actual application, the foregoing functions can be allocated to and implemented by different functional modules based on a requirement, that is, an inner structure of the apparatus is divided into different functional modules, to implement all or some of the functions described above. For details about a specific implementation process, refer to the method embodiment. Details are not described herein again.

All or some of the foregoing embodiments may be implemented by using software, hardware, firmware, or any combination thereof. When the software is used for implementation, all or some of the embodiments may be implemented in a form of a computer program product. The computer program product includes one or more computer instructions. When the computer program instructions are loaded and executed on a server or a terminal, all or some of the procedures or functions according to the embodiments of this application are generated. The computer instructions may be stored in a computer-readable storage medium or may be transmitted from a computer-readable storage medium to another computer-readable storage medium. For example, the computer instructions may be transmitted from a web site, computer, server, or data center to another website, computer, server, or data center in a wired (for example, a coaxial optical cable, an optical fiber, or a digital subscriber wire) or wireless (for example, infrared, radio, or microwave) manner. The computer-readable storage medium may be any usable medium accessible by a server or a terminal, or a data storage device, such as a server or a data center, integrating one or more usable media. The usable medium may be a magnetic medium (for example, a floppy disk, a hard disk, or a magnetic tape), an optical medium (for example, a digital video disk (DVD)), or a semiconductor medium (for example, a solid-state drive).

Other embodiments of this application would be easily conceived by those skilled in the art after considering the specification and practicing the contents disclosed herein. This application is intended to cover any variations, uses or adaptations of this application, which follow the general principles of this application and include common knowledge or common technical means in the technical field not disclosed in this application. And the specification and examples are to be regarded as examples only, and the true scope and spirit of this application are indicated by the following claims.

It should be understood that this application is not limited to the precise structure described above and shown in the drawings, and various modifications and changes can be made without departing from its scope. The scope of this application is defined only by the appended claims.

What is claimed is:

1. A method for computing multi-party privacy based on semi-trusted hardware, which is applied to semi-trusted hardware, comprising:
    acquiring random number masks and random seeds of all user terminals;
    generating a garbled circuit seed according to the random seeds;
    generating a garbled circuit according to a predetermined circuit description and the garbled circuit seed, wherein the garbled circuit comprises garbled tables, wire labels and decoding information;
    sending the wire labels corresponding to inputs of all user terminals to a user terminal corresponding to the semi-trusted hardware by using an oblivious transfer protocol, wherein the sending the wire labels comprises: arranging the wire labels corresponding to the inputs of all user terminals in the garbled circuit according to the random number masks of all user terminals, and executing a plurality of 1-out-of-2 oblivious transfer protocols according to the arranged input wire labels corresponding to each bit and encrypted input corresponding to each bit input by the user terminal, wherein each oblivious transfer protocol corresponds to the input of one bit by the user terminal, in such a manner that the semi-trusted hardware sends the wire labels corresponding to all user terminal inputs to the user terminal corresponding to the semi-trusted hardware; and
    sending the garbled tables and the decoding information to the user terminal corresponding to the semi-trusted hardware, in such a manner that the user terminal computes an output value according to the garbled tables, the decoding information and the wire labels corresponding to the inputs of all user terminals.

2. The method according to claim 1, wherein said acquiring random number masks and random seeds of all user terminals comprises:
    acquiring a random number mask and a random seed of the user terminal corresponding to the semi-trusted hardware;
    acquiring encrypted random number masks and encrypted random seeds of other user terminals through a secure channel between the semi-trusted hardware and other user terminals;
    decrypting the encrypted random number masks and the encrypted random seeds according to a symmetric key between the semi-trusted hardware and each user terminal to obtain decrypted random number masks and decrypted random seeds;
    verifying the decrypted random number masks and the decrypted random seeds; and
    when the verification is passed, taking the decrypted random number masks as the random number masks of other user terminals, and the decrypted random seeds as the random seeds of other user terminals.

3. The method according to claim 1, wherein said generating a garbled circuit according to a predetermined circuit description and the garbled circuit seed comprises:

generating wire labels according to the predetermined circuit description and the garbled circuit seed, wherein the wire label comprises a plurality of 0 wire labels and a plurality of 1 wire labels;

generating a plurality of garbled tables according to the predetermined circuit description, the 0 wire labels and the 1 wire labels, wherein a number of the garbled tables is equal to a number of Boolean gates in the predetermined circuit description; and generating a plurality of pieces of decoding information according to the predetermined circuit description and wire labels of a circuit output wire.

4. A method for computing privacy based on semi-trusted hardware, which is applied to a user terminal, comprising:

performing by the user terminal:

constructing a secure channel with the semi-trusted hardware corresponding to all other user terminals by using a remote attestation mechanism;

selecting a random number mask randomly and encrypting an input according to the random number mask;

sending the encrypted input to all other user terminals;

sending the random number mask to the semi-trusted hardware corresponding to all other user terminals via the secure channel, and sending the random number mask to a semi-trusted hardware corresponding to the user terminal;

selecting a random seed randomly, sending the random seed to the semi-trusted hardware corresponding to all other user terminals via the secure channel, and sending the random seed to the semi-trusted hardware corresponding to the user terminal, in such a manner that each semi-trusted hardware corresponding to each user terminal of all user terminals obtains random number masks and random seeds of all user terminals, wherein the semi-trusted hardware corresponding to the user terminal performs: generating a garbled circuit seed according to the random seeds of all user terminals, generating a garbled circuit according to a predetermined circuit description and the garbled circuit seed, wherein the garbled circuit comprises garbled tables, wire labels and decoding information, sending the wire labels corresponding to inputs of all user terminals to the user terminal corresponding to the semi-trusted hardware by an oblivious transmission protocol, and sending the garbled tables and decoding information to the user terminal corresponding to the semi-trusted hardware;

acquiring wire labels corresponding to the inputs of all user terminals from the corresponding semi-trusted hardware by the oblivious transfer protocol;

acquiring the garbled tables and decoding information from the corresponding semi-trusted hardware; and computing an output value according to the garbled tables, the decoding information and the wire labels corresponding to the inputs of all user terminals.

5. A device for computing privacy based on semi-trusted hardware, which is applied to semi-trusted hardware, comprising hardware modules, the hardware modules include:

a first acquisition module configured to acquire random number masks and random seeds of all user terminals;

the first generation module configured to generate a garbled circuit seed according to the random seeds;

a second generation module configured to generate a garbled circuit according to a predetermined circuit description and the garbled circuit seed, wherein the garbled circuit comprises garbled tables, wire labels and decoding information;

a first sending module configured to send the wire labels corresponding to inputs of all user terminals by using an oblivious transfer protocol, wherein the wire labels are sent by: arranging the wire labels corresponding to the inputs of all user terminals in the garbled circuit according to the random number masks of all user terminals, and executing a plurality of 1-out-of-2 oblivious transfer protocols according to the arranged input wire labels corresponding to each bit and encrypted input corresponding to each bit input by the user terminal, wherein each oblivious transfer protocol corresponds to the input of one bit by the user terminal, in such a manner that the semi-trusted hardware sends the wire labels corresponding to all user terminal inputs to the user terminal corresponding to the semi-trusted hardware; and a second sending module configured to send the garbled tables and decoding information to a user terminal corresponding to the semi-trusted hardware, in such a manner that the user terminal computes an output value according to the garbled tables, decoding information and the wire labels corresponding to the inputs of all user terminals.

6. The device according to claim 5, wherein said generating a garbled circuit according to a predetermined circuit description and the garbled circuit seed comprises:

generating wire labels according to the predetermined circuit description and the garbled circuit seed, wherein the wire label comprises a plurality of 0 wire labels and a plurality of 1 wire labels;

generating a plurality of garbled tables according to the predetermined circuit description, the 0 wire labels and the 1 wire labels, wherein a number of the garbled tables is equal to a number of Boolean gates in the predetermined circuit description; and generating a plurality of pieces of decoding information according to the predetermined circuit description and wire labels of a circuit output wire.

7. The device according to claim 5, which is applied to a user terminal, further comprising hardware modules including:

a construction module configured to construct a secure channel with semi-trusted hardware corresponding to other user terminals by using a remote attestation mechanism;

an encryption module configured to randomly select random number mask and encrypt an input according to the random number mask;

a third sending module configured to send the encrypted input to all other user terminals;

a fourth sending module configured to send the random number mask to the semi-trusted hardware corresponding to the other user terminals via the secure channel, and send the random number mask to the semi-trusted hardware corresponding to the user terminal;

a fifth sending module configured to randomly select a random seed, send the random seed to the semi-trusted hardware corresponding to other user terminals via the secure channel, and at a same time directly send the random seed to the semi-trusted hardware corresponding to the user terminal, in such a manner that each semi-trusted hardware corresponding to each user terminal of all user terminals obtains random number masks and random seeds of all user terminals, wherein the semi-trusted hardware corresponding to the user terminal performs: generate a garbled circuit seed according to the random seeds of all user terminals, generate the garbled circuit according to the predetermined circuit description and the garbled circuit seed, send the wire labels corresponding to the inputs of all user terminals to the user terminal corresponding to the semi-trusted hardware by an oblivious transmission protocol, and send the garbled tables and decoding information to the user terminal corresponding to the semi-trusted hardware;

a second acquisition module configured to acquire the wire labels corresponding to the inputs of all user terminals from the corresponding semi-trusted hardware by the oblivious transfer protocol;

a third acquisition module configured to acquire the garbled tables and decoding information from the corresponding semi-trusted hardware; and a computation module configured to compute an output value according to the garbled tables, the decoding information and the wire labels corresponding to the inputs of all user terminals.

8. An electronic device comprising: one or more processors; a memory for storing one or more programs; wherein when the one or more programs are executed by the one or more processors, the one or more processors implement a method for computing multi-party privacy based on semi-trusted hardware, which is applied to semi-trusted hardware, the method comprising:

acquiring random number masks and random seeds of all user terminals;

generating a garbled circuit seed according to the random seeds;

generating a garbled circuit according to a predetermined circuit description and the garbled circuit seed, wherein the garbled circuit comprises garbled tables, wire labels and decoding information;

sending the wire labels corresponding to inputs of all user terminals to a user terminal corresponding to the semi-trusted hardware by using an oblivious transfer protocol, wherein the sending the wire labels comprises: arranging the wire labels corresponding to the inputs of all user terminals in the garbled circuit according to the random number masks of all user terminals, and executing a plurality of 1-out-of-2 oblivious transfer protocols according to the arranged input wire labels corresponding to each bit and encrypted input corresponding to each bit input by the user terminal, wherein each oblivious transfer protocol corresponds to the input of one bit by the user terminal, in such a manner that the semi-trusted hardware sends the wire labels corresponding to all user terminal inputs to the user terminal corresponding to the semi-trusted hardware; and sending the garbled tables and the decoding information to the user terminal corresponding to the semi-trusted hardware, in such a manner that the user terminal computes an output value according to the garbled tables, the decoding information and the wire labels corresponding to the inputs of all user terminals.

9. A non-transitory computer readable storage medium on which computer instructions are stored, wherein the instructions, when executed by a processor, implement a method for computing multi-party privacy based on semi-trusted hardware, which is applied to semi-trusted hardware, the method comprising:

acquiring random number masks and random seeds of all user terminals;

generating a garbled circuit seed according to the random seeds;

generating a garbled circuit according to a predetermined circuit description and the garbled circuit seed, wherein the garbled circuit comprises garbled tables, wire labels and decoding information;

sending the wire labels corresponding to inputs of all user terminals to a user terminal corresponding to the semi-trusted hardware by using an oblivious transfer protocol, wherein the sending the wire labels comprises: arranging the wire labels corresponding to the inputs of all user terminals in the garbled circuit according to the random number masks of all user terminals, and executing a plurality of 1-out-of-2 oblivious transfer protocols according to the arranged input wire labels corresponding to each bit and encrypted input corresponding to each bit input by the user terminal, wherein each oblivious transfer protocol corresponds to the input of one bit by the user terminal, in such a manner that the semi-trusted hardware sends the wire labels corresponding to all user terminal inputs to the user terminal corresponding to the semi-trusted hardware; and sending the garbled tables and the decoding information to the user terminal corresponding to the semi-trusted hardware, in such a manner that the user terminal computes an output value according to the garbled tables, the decoding information and the wire labels corresponding to the inputs of all user terminals.

\* \* \* \* \*